United States Patent [19]

Bhadsavle

[11] Patent Number: 5,802,124
[45] Date of Patent: Sep. 1, 1998

[54] SYSTEMS AND METHODS FOR TRANSMITTING DATA WITHIN A COMPUTER SYSTEM

[75] Inventor: Sandeep Y. Bhadsavle, Austin, Tex.

[73] Assignee: Texas Instruments Incorporated, Dallas, Tex.

[21] Appl. No.: 584,059

[22] Filed: Jan. 11, 1996

[51] Int. Cl.[6] .................................................. G06F 13/00
[52] U.S. Cl. .................... 375/377; 375/354; 395/309; 395/560
[58] Field of Search .................................... 375/219, 220, 375/377, 354; 395/285, 286, 821, 835, 837, 838, 853, 309, 560; 364/131, 132, DIG. 2, 919, 926.9, 927.92, 940, 942.2, DIG. 1, 238.3, 239, 239.9, 284.2, 260, 260.1

[56] References Cited

U.S. PATENT DOCUMENTS

| | | | |
|---|---|---|---|
| 5,522,087 | 5/1996 | Hsiang | 395/383 |
| 5,623,611 | 4/1997 | Matsukawa et al. | 395/309 |

*Primary Examiner*—Stephen Chin
*Assistant Examiner*—Amanda T. Le
*Attorney, Agent, or Firm*—Ronald O. Neerings; James C. Kesterson; Richard L. Donaldson

[57] ABSTRACT

A system and method for transmitting data within a computer system is disclosed. The computer system includes a computer (12), a host device (14), a satellite device (16) and an interface (18). The interface (18) comprises a single conductor (28) which permits bi-directional communication between the host device (14) and the satellite device (16).

24 Claims, 3 Drawing Sheets

SYSTEMS AND METHODS FOR TRANSMITTING DATA WITHIN A COMPUTER SYSTEM

FIELD OF THE INVENTION

The present invention relates to systems and methods for transmitting data within a computer system. In particular, it relates to systems and methods for transferring data between a host device and a satellite device of a portable computer via a single conductor interface.

BACKGROUND OF THE INVENTION

In today's mobile world, portable computers (i.e., laptops, notebooks and personal digital assistants (PDAs) have become commonplace. These computers have several requirements in light of their mobile nature. These requirements include that they have a compact and simple hardware configuration, and that they be light, rugged, and reliable to withstand the shocks associated with travel. Due to evolving sophistication of computer applications and software, these computers must also provide high computation power with complex microprocessor architecture.

The power needed to operate these computers must be "portable" so that power can be supplied to the computer when an electrical outlet is not available, such as on an airplane. Typically, batteries are used as the primary source of portable power for portable computers. However, unlike an electrical power source which can supply continuous power as long as the power is "on", the life of a battery is limited. As a result, it is imperative that a user be able to determine at any given point the amount of battery life that remains available. For example, if the user is going to be on an airplane for four hours, he or she will want to be sure four hours of battery life are still available.

Two devices typically monitor the performance of the computer's battery, either the host microprocessor within the computer or the battery microprocessor. The host microprocessor, however, is already significantly burdened with application overhead. As a result, real time monitoring of the battery is usually handled by the battery microprocessor. The battery microprocessor, however, is already burdened with measuring the amount of charge flowing into and out of the battery, as well as other battery parameters. As a result, interfaces have been developed to transfer the information gathered by the battery microprocessor back to the host microprocessor so that this information may be presented to the computer user in a suitable form.

Existing interfaces for such host and satellite devices, however, have been designed with at least two conductors, either as "Receive and Transmit" lines or as "Data and Clock" lines, along with a third common conductor. Such an interface requires more than one contact pin, and often several such pins, such as in computer systems using more than one battery pack. Contact pins used for such applications are typically gold plated, which increases the costs of the interface. Such a multi-pin arrangement also increases the physical size of the interface. As a result, the rigidity and reliability of the interface and hence that of the computer system are significantly impaired.

Existing interfaces also have a configuration which requires serial communication, which in turn requires UARTs on both sides of the interface, thereby further increasing the size, complexity and cost of the interface. Where the on-board resources of both the host microprocessor and battery microprocessor are stretched to their limits, the software required to implement a multiple conductor interface may be prohibitive. Such interfaces have also been shown to have the negative side effect of causing a significant drain on the battery itself.

Accordingly, a need has arisen to develop an interface for a computer system which has a compact and simple hardware and software configuration, which is low cost, rigid and reliable, and which does not adversely affect the performance of the host and satellite devices in communication therewith.

SUMMARY OF THE INVENTION

The present invention fulfills the need for an interface between a host and a satellite device of a computer system which has a compact and simple hardware and software configuration, which is low cost, rigid, and reliable, and which does not adversely affect the performance of the host or satellite device in communication therewith. More particularly, one aspect of the invention relates to a computer system comprising a host device, a satellite device, and an interface in communication with the host device and the satellite device, wherein the interface comprises a single conductor adapted to transmit a flow of data between the host device and the satellite device. The single conductor permits a bi-directional flow of data between the host and satellite devices. In a preferred form, the conductor has a host device end having a single host contact pin and a satellite device end having a single satellite contact pin.

The satellite device includes a signal generator for generating a signal having a window representing a period of time during which data may flow through the conductor of the interface. The satellite device may include a window controller for selectively controlling the opening and closing of the window of the signal generated by the signal generator.

The host device includes a controller for controlling the flow of data from the satellite device, such that data is permitted to flow to the host device only during the window of the signal generated by the signal generator of the satellite device. The controller may include an inhibitor for selectively inhibiting the flow of data being transmitted through the interface from the satellite device to the host device during the window for a predetermined period of inhibitor time, the predetermined period of inhibitor time being between a range of a minimum inhibitor time and a maximum inhibitor time. The satellite device also includes a window controller for closing the window of the signal generating by the signal generator of the satellite device when the inhibitor has inhibited the flow of data for a period of time longer than the maximum inhibitor time.

The controller may include a window monitor for monitoring the conductor of the interface for the opening and closing of the window of the signal generated by the signal generator of the satellite device, and a floating mechanism for floating the conductor of the interface when the window monitor detects that the window of the signal generated by the signal generator is closed. The host device may further include a synchronizer for synchronization of the host device with the satellite device upon detection of the opening of the window by the window monitor. The synchronizer comprises a request to send signal generator for generating a request to send signal to the satellite device indicating that the host device is ready to send data. The satellite device in turn further comprises a clear to send signal generator for generating a clear to send signal to the host device upon receipt of the request to send signal from the host device if it is ready to receive the data from the host device.

The host device includes a command signal generator adapted to generate a command signal. The satellite device includes a response signal generator adapted to generate a response signal upon receipt of the command signal from the host device. The control device of the host device may include a host delay mechanism for delaying the successive bytes of a multibyte command signal for a predetermined period of host delay time. Likewise, the satellite device may include a satellite delay mechanism for delaying the successive bytes of a multibyte response signal for a predetermined period of satellite delay time.

The host and satellite devices may each also include a host and satellite monitor, respectively, for monitoring whether communication between the host device and the satellite device is in progress, and a host and satellite preventor mechanism, respectively, for preventing any further transmission of data between the host device when the respective host or satellite monitor determines that communication between the host device and the satellite device is in progress.

In a preferred form, the computer is a portable computer, and the host and satellite devices each comprise a microprocessor.

Another aspect of the invention relates to the method of transmitting data between a host device and a satellite device of a computer system via an interface comprising a single, bi-directional conductor in communication with the host and satellite devices. The method comprises the steps of generating a signal from the satellite device at a predetermined rate, the signal having a window representing a period of time during which data may flow through the conductor of the interface, monitoring the conductor for the opening and closing of the window, synchronizing the satellite device with the host device when the window has been detected, and transmitting data between the host device and the satellite device upon synchronization of the host device and the satellite device.

The method may also comprise the step of selectively inhibiting the transmission of data from the satellite device to the host device when the window is open for a predetermined period of inhibitor time, the predetermined period of inhibitor time being between a range of a minimum inhibitor time and a maximum inhibitor time, and preferably includes the step of closing the window if the transmission of the flow of data is inhibited for longer than the maximum inhibitor time.

The method may also comprise the steps of monitoring whether communication between the host device and the satellite device is in progress and preventing any further transmission of data between the host device and the satellite device if communication between the host device and the satellite device is already in progress.

The method may comprise the step of floating the conductor of the interface when the window of the signal generated by the satellite device is closed.

The method may further comprise the steps of generating a request to send command signal from the host device upon synchronization of the host device and the satellite device, and generating a clear to send command signal from the satellite device upon receipt of the request to send command signal from the host device.

The step of transmitting may yet further comprise the steps of transmitting a command signal from the host device and transmitting a response signal from the satellite device upon receipt of the command signal from the host device, and the method may further comprise the steps of delaying the transmission of the response signal from the satellite device for a predetermined period of satellite delay time when the response signal comprises a plurality of bytes, and delaying the transmission of the command signal from the host device for a predetermined period of host delay time when the command signal comprises a plurality of bytes.

Yet another aspect of the invention relates to the interface itself. In particular, the interface includes a single host contact pin, a single satellite contact pin, and a single conductor in communication with the host contact pin and the satellite contact pin, which permits a bi-directional flow of data therein.

BRIEF DESCRIPTION OF THE DRAWINGS

In the drawings, where like numerals refer to like features throughout the several views.

DETAILED DESCRIPTION OF THE PREFERRED EMBODIMENT

The present invention concerns a system for transmitting a flow of data between a host device and a satellite device of a computer system, which includes an interface having a single conductor adapted to transmit the flow of data between the host and satellite device. The single conductor of the interface permits bi-directional communication between the host and satellite devices. By providing such an interface, a compact and simple hardware and software configuration may be obtained. With such a configuration, a low cost, rigid and reliable interface which does not adversely affect the performance of the devices in communication therewith is achieved.

Figure 1:
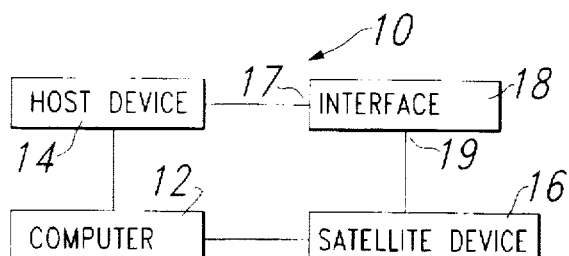
FIG. 1 is a block diagram of a computer system according to one embodiment of the present invention.

Referring now to FIG. 1, a computer system 10 for transmitting a flow of data in accordance with the present invention is shown. Computer system 10 includes a computer 12, a host device 14, a satellite device 16 and an interface 18. For illustrative purposes only, computer system 10 will be described in connection with a computer 12 which is a portable computer, a host device 14 which is a microprocessor, and a satellite device 16 which is composed of a battery pack 11 and a battery microprocessor 13 (see FIG. 3). In a preferred form, computer 12 is a Texas Instruments TM5000 series notebook computer, host device 14 is a keyscan microprocessor, battery pack 11 is a LiIon battery pack, battery microprocessor 13 is a Gas Gauge microprocessor, and interface 18 is implemented at the software level. It can be understood by one skilled in the art, however, that the type of the computer, host device, satellite device and interface implementation used in computer system 10 is not critical, and that the present invention may be realized in any environment in which there is a master-slave relationship defined between two devices in communication with each other.

Figure 2:
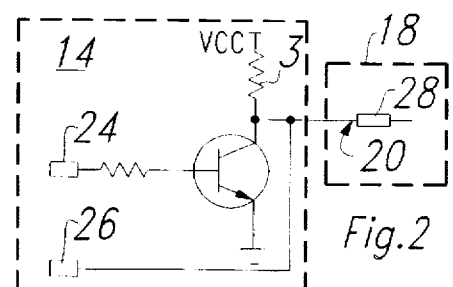
FIG. 2 is an electrical schematic of the hardware connection between the host device and the interface shown in FIG. 1.

FIG. 2 shows one embodiment of the physical connection between host device 14 and interface 18 of computer system 10. This circuit, however, applies equally to the connection between satellite device 16 and interface 18. In particular, host device 14 connects to interface 18 through transmit and receive signal lines 24 and 26, respectively. While the transmit and receive functions are shown as two separate signals, they may also be merged into one signal (not shown) if the host device is itself capable of handling a bi-directional flow of data. In such a case, the circuit shown in FIG. 2 would not be required.

As is further shown in FIG. 2, interface 18 is comprised of a single conductor 28 (i.e., data line) on which all bi-directional communication between host device 14 and satellite device 16 takes place. Referring back to FIG. 1, interface 18 has a host device end 17 having a single host contact pin 20 (see FIG. 2) for connecting interface 18 to host device 14, and a satellite device end 19 having a single satellite contact pin (not shown) for connecting interface 18 to satellite device 16. Typically, these contact pins are gold plated.

All of the communication between host device 14 and satellite device 16 takes place via interface 18. Interface 18 permits bi-directional communication between host device 14 and satellite device 16 through a single conductor by using the negative terminal of satellite device 16 as a return path. Since this path is also used to connect battery pack 11 to computer 12, no additional connection is required. As a result, a simple hardware configuration is achieved. Moreover, by reducing the number of contact pins required to connect interface 18 to host device 14 and satellite device 16, the cost of interface 18 is significantly reduced, and its rigidity and reliability is significantly improved.

In one preferred embodiment of the present invention, the communication protocol between host device 14 and satellite device 16 is half duplex and comprises a RS232 format, while the signal levels are 5 Volts, TTL/CMOS style. With such a configuration, only one device may "talk" at any given time while the other device must listen. The communication parameters are fixed at 38.4K baud, 8 data bits/character, no parity and a stop bit. The deviation from the standard RS232-style serial communication is due to the unique, single wire nature of interface 18, as opposed to the two data wires (i.e., Receive and Transmit, or Data and Clock) typically used in existing interfaces.

Figure 3:
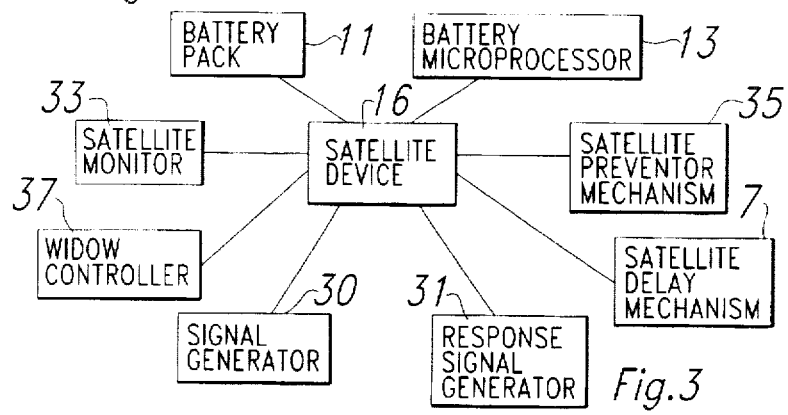
FIG. 3 is a block diagram of one embodiment of the satellite device shown in FIG. 1.
Figure 4:
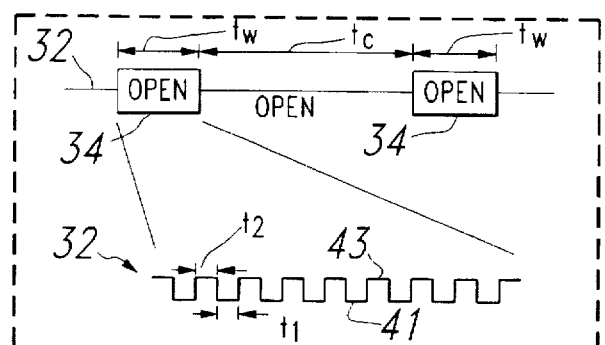
FIG. 4 is a schematic diagram of one embodiment of the signal generated by the signal generator shown in FIG. 3.

Referring now to both FIGS. 3 and 4, satellite device 16 includes a signal generator 30 for generating a signal 32 to indicate that it is ready to communicate with host device 14. Signal 32 has a window 34 representing the period of time, $t_w$, in which communication between host device 14 and satellite device 16 may take place. During $t_w$, window 34 is considered "open". Period of time $t_c$ represents the period of time in which communication between host device 14 and satellite device 16 may not take place. During $t_c$, window 34 is considered "closed". Satellite device 16 preferably includes a window controller 37 for selectively opening and closing window 34 of signal 32. In a preferred form, window 34 remains open for approximately fifty (50) milliseconds and remains closed for approximately two (2) seconds.

As is particularly shown in FIG. 4, when window 34 opens, signal 32 repeatedly drives conductor 28 of interface 18 to a low state 41 and floats it, where it is then pulled up to a high state 43 by a pull-up resistor 3 (see FIG. 2) for predetermined periods of time $t_1$ and $t_2$, respectively. In the implementation shown, signal 32 is shown as a square waveform, and periods of time $t_1$ and $t_2$ are the same and are each approximately ten (10) microseconds. It can be understood by one skilled in the art, however, that the type of waveform of signal 32 and the periods of time $t_1$ and $t_2$ may vary and are not critical to the implementation of the present invention.

Figure 5:
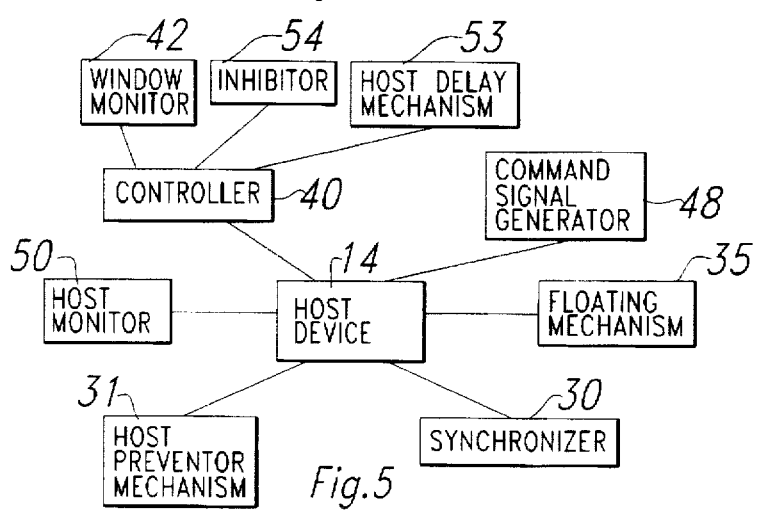
FIG. 5 is a schematic diagram of one embodiment of the host device shown in FIG. 1.

Referring now to FIG. 5, host device 14 includes a controller 40 for controlling the flow of data transmitted from satellite device 16 through interface 18, such that communication between host device 14 and satellite device 16 is only permitted during window 34 of signal 32 (see FIG. 4). In this regard, controller 40 includes a window monitor 42 for monitoring conductor 28 of interface 18 for the opening and closing of window 34 of signal 32. Preferably, window monitor 42 permits host device 14 to continue performing its other critical tasks while also monitoring conductor 28. If window monitor 42 detects that window 34 is closed, host device 14 includes a floating mechanism 44 for floating conductor 28, thereby indicating to computer system 10 that there is no communication in progress. This polling nature of computer system 10 saves precious computing resources, especially those of host device 14.

Figure 6:
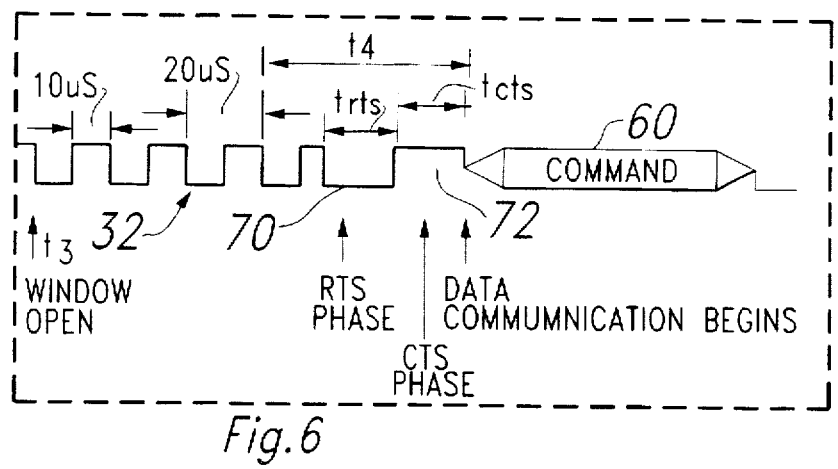
FIG. 6 is a schematic diagram of one embodiment of initiating communication between the host and satellite devices shown in FIG. 1 during the window shown in FIG. 3.

If window monitor 42 of host device 14 detects that window 34 is open, as is further shown in FIG. 6 at $t_3$, but host device 14 is not ready or does not need to communicate with satellite device 16, host device 14 simply ignores signal 32. But, if host device 14 is ready or needs to communicate with satellite device 16, host device 14 and satellite device 16 then undergo an initial "handshaking" routine in order to synchronize host device 14 with satellite device 16, both of which run asynchronously. Such handshaking is performed by a synchronizer 43 of host device 14. This handshaking routine, however, is only required to establish a connection between host device 14 and satellite device 16 through interface 18 (i.e., to ensure that satellite device 16 is ready to receive data from host device 14). After the initial handshake, communication between host device 14 and satellite device 16 is the same as a typical half duplex, serial type.

Referring further to FIG. 6, the synchronization of host device 14 and satellite device 16 essentially consists of two commands, namely a Request to Send ("RTS") command from host device 14 and a Clear to Send ("CTS") command from satellite device 16. In this regard, referring back to FIGS. 3 and 5, host device 14 includes a command signal generator 48 for generating an RTS command signal 70. Host device 14 notifies satellite device 16 that it has data to send by driving conductor 28 low for a predetermined period of time, $t_{rts}$, through RTS command signal 70, also referred to as the RTS phase. Satellite device 16 in turn includes a response signal generator 31 for generating a CTS command signal 72. CTS command signal 72 releases conductor 28 for a predetermined period of time $t_{cts}$, through CTS command signal 72, also referred to as the CTS phase. Once satellite device 16 receives RTS command signal 70 from host device 14, and assuming that satellite device 16 is ready to communicate with host device 14. CTS signal generator 31 generates CTS command signal 72. Once CTS command signal 72 has been received by host device 14, synchronization is complete. In the implementation shown, $t_{rts}$ is approximately twenty (20) microseconds, $t_{cts}$ is approximately twenty-five (25) microseconds but no more than fifty (50) microseconds, and response signal generator 31 generates CTS command signal 72 immediately upon receipt of RTS command signal 70.

Host device 14 may begin sending data as represented by command signal 60 in FIG. 6 to satellite device 16 only after synchronization has been successfully completed. However, if host device 14 does not initiate the transmission of data within a predetermined period of time, $t_4$, from the end of the RTS phase, then satellite device 16 gives up waiting and returns to normal operation. In a preferred embodiment, $t_4$ is no longer than fifty (50) microseconds.

Figure 7A:
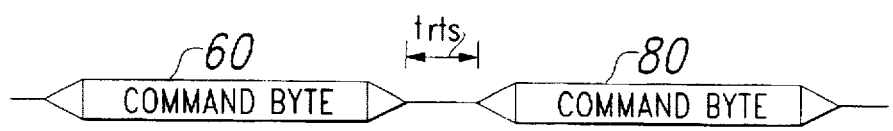
FIGS. 7A–C are schematic diagrams of communication between the host and satellite devices shown in FIG. 1 for a single byte response signal from the satellite device, a multibyte response signal from the satellite device, and a multibyte command signal from the host device, respectively.

Referring now to FIG. 7A, once command signal 60 has been sent, host device 14 waits for a predetermined amount of time, $t_{srr}$, to obtain a response signal 80 from satellite device 16. Satellite device 16 must respond to command signal 60 sent by host device 14 before it can return to its normal operation. If satellite device 16 does not respond within this period of time, any response sent after this period of time will be lost.

Figure 7B:
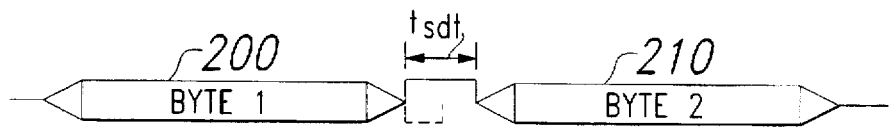

FIG. 7B demonstrates a case where response signal 80 from satellite device 16 contains more than one byte of data, namely bytes 200 and 210. Satellite device 16 includes a satellite delay mechanism 7 (see FIG. 3) for delaying the generation of the successive bytes of response signal 80 for a predetermined period of satellite delay time, $t_{sdr}$. In the preferred embodiment, the time delay between bytes 200 and 210, $t_{sdr}$, is preferably a minimum of ten (10) microseconds and a maximum of fifty (50) microseconds.

Figure 7C:
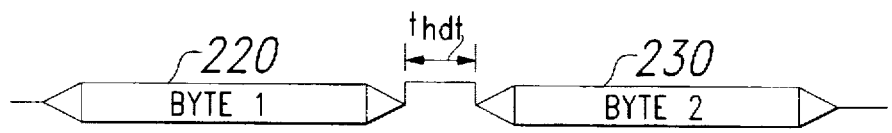

FIG. 7C illustrates a case where command signal 60 from host device 14 consists of more than one byte of data, namely bytes 220 and 230. Host device 14 includes a host delay mechanism 53 (see FIG. 5) for delaying the generation of the successive bytes of command signal 60, namely bytes 220 and 230, for a predetermined period of host delay time, $t_{hdr}$. In the preferred embodiment, $t_{hdr}$ is within a range between a minimum of ten (10) microseconds and a maximum of fifty (50) microseconds.

Host device 14 may inhibit satellite device 16 from transmitting a response for a predetermined amount of inhibitor time, $t_i$, either after it sends command signal 60 or after it receives one byte of a multi-byte response signal 80 from satellite device 16 (see FIG. 7B). Such a configuration is particularly advantageous and useful if host device 14 gets "overwhelmed" with data (such as when satellite device 16 sends more than one battery parameter at a time) or when it has to perform tasks having a higher priority than servicing satellite device 16. Inhibitor time, $t_i$, may be within a range between a minimum inhibitor time and a maximum inhibitor time. Preferably, the maximum inhibitor time is approximately fifty (50) milliseconds.

In this regard, controller 40 of host device 14 includes an inhibitor 54 for inhibiting the flow of data transmitted through conductor 28 of interface 18 to host device 14 during window 34 (see FIG. 5). Inhibitor 54 accomplishes this by driving conductor 28 low. Since satellite device 16 may only send data to host device 14 or respond to a command signal 60 sent by host device 14 when host device 14 has not inhibited satellite device 16, the flow of data into host device 14 is directly controlled by host device 16. In a preferred embodiment, inhibitor 54 may selectively inhibit the flow of data from satellite device 16.

If $t_i$ is greater than the maximum inhibitor time, window controller 37 closes window 34, and satellite device 16 returns to its normal operation. When window 34 reopens, a fresh communication between host device 14 and satellite device 16 begins. No "leftover" data from the previous communication will be carried forward.

Referring back to FIG. 5, host device 14 also preferably includes a host monitor 50 for monitoring whether a flow of data is being transmitted through conductor 28 of interface 18 from satellite device 16 before it starts to send command signal 60. If communication is in progress (i.e. if both host device 14 and satellite device 16 are locked in communication), a host preventor mechanism 52 prevents the transmission of any additional flow of data through conductor 28 of interface 18 until said previous communication has been completed. Likewise, referring back to FIG. 3, satellite device 16 also preferably includes a satellite monitor 33 for monitoring whether a flow of data is being transmitted through conductor 28 of interface 18 from host device 14 before it starts to send any data. If communication is in progress, satellite device 16 also includes a satellite preventor mechanism 35 for preventing the transmission of any additional flow of data through conductor 28 of interface 18 until said communication is completed. With such a configuration, if communication is already in progress, then either device must complete the communication; namely it must receive all of the data being sent and respond appropriately.

Figure 8:
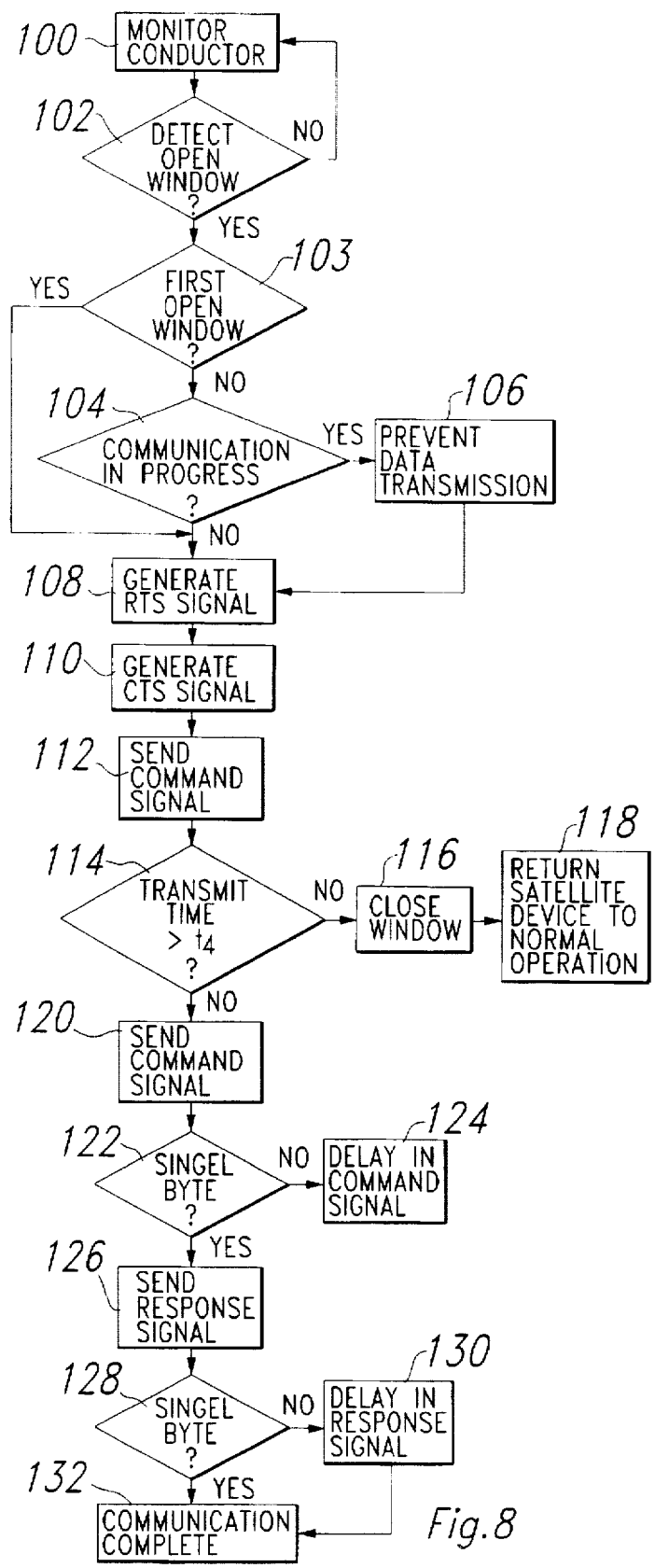
FIG. 8 is a flow chart representation of the preferred steps taken for data to be transmitted between the host device, the interface and the satellite device of the computer system shown in FIG. 1.

Referring now to FIG. 8, a flow chart is shown illustrating one preferred operational sequence of transmitting data between host device 14 and satellite device 16 via interface 18. Specifically, at 100, host device 14 monitors conductor 28 with window monitor 42 until the opening of window 34 of signal 32 is detected. If at 102, an open window is not detected, window monitor 42 continues monitoring conductor 28.

If an open window is detected, at 103 a check is made to determine whether this window is the first open window detected by window monitor 42. If not, at 104 satellite monitor 33 and host monitor 50 both check whether communication between host device 14 and satellite device 16 is already in progress. If communication is already in progress, then at 106, the respective preventor mechanism (i.e., satellite preventor mechanism 35 or host preventor mechanism 52) prevents any additional flow of data from being transmitted across interface 18 until the communication already in progress has been completed.

If no communication is already in progress, or if the open window detected by window monitor 42 is the first open window, or once such communication has been completed, at 108, host device 14 generates RTS command signal 70 to satellite device 16. At 110, satellite device 16 generates CTS command signal 72 back to host device 14.

At 112, host device 14 generates command signal 60. At 114, a check is made to determine whether the time in which it took host device 14 to generate command signal 60 (i.e., $t_4$) has exceeded a predetermined maximum allowable time. If so, at 116, satellite device 16 closes window 34 and at 118, satellite device 16 returns to normal operation.

If $t_4$ has not exceeded the maximum allowable time, at 120, host device 14 generates command signal 60 to satellite device 16. At 122, a check is made to determine whether command signal 60 is a single or a multi-byte command signal. If command signal 60 is a multi-byte signal, host delay mechanism 53 delays the period of time between the successive bytes of command signal 60. At 126, satellite device 16 generates response signal 80. At 128, a check is made to determine whether response signal 80 is a single or a multi-byte response signal. If response signal 80 is a multi-byte signal, at 130 satellite delay mechanism 7 delays the period of time between successive bytes of response signal 80. At 132, communication is completed.

After steps 120 and 126, if host device 14 gets overwhelmed with data or if it has higher priority tasks pending, inhibitor 54 may inhibit satellite device 16 from transmitting data across interface 18. If inhibitor 54 inhibits the transmission of data for longer than the maximum inhibitor time, satellite device 16 closes window 34 and satellite device 16 returns to normal operation (not shown).

The foregoing constitutes a description of various features of a preferred embodiment. Numerous changes to the preferred embodiment are possible without departing from the spirit and scope of the invention. Hence, the scope of the invention should be determined with reference not to the preferred embodiment, but to the following claims.

I claim:

1. A computer system, comprising:

a host device;

a satellite device comprising a signal generator adapted to generate a signal having a window representing a period of time during which communication between the host device and the satellite device may take place, said host device comprising a controller adapted to control the flow of data from the satellite device, such that communication between the host device and the satellite device is permitted only during the window of the signal generated by the signal generator of the satellite device; and an interface in communication with the host device and the satellite device, the interface comprising a single conductor adapted to transmit a flow of data between the host device and the satellite device.

2. The computer system of claim 1, wherein the flow of data transmitted by the conductor of the interface is bidirectional.

3. The computer system of claim 1, wherein the satellite device comprises a window controller adapted to selectively control the opening and closing of the window of the signal.

4. The computer system of claim 1, wherein the signal generated by the signal generator of the satellite device is a square waveform.

5. The computer system of claim 1, wherein the controller comprises a window monitor adapted to monitor the conductor of the interface for the opening and closing of the window of the signal generated by the signal generator of the satellite device.

6. The computer system of claim 5, wherein the host device comprises a floating mechanism adapted to float the conductor of the interface when the window monitor detects that the window of the signal generated by the signal generator of the satellite device is closed.

7. The computer system of claim 5, wherein the host device comprises a synchronizer adapted to synchronize the host device with the satellite device upon detection of the opening of the window by the window monitor.

8. The computer system of claim 7, wherein the synchronizer comprises a request to send signal generator adapted to generate a request to send signal indicating that the host device is ready to communicate with the satellite device, and wherein the satellite device further comprises a clear to send signal generator adapted to generate a clear to send signal upon receipt of the request to send signal from the host device if the satellite device is ready to communicate with the host device.

9. The computer system of claim 7, wherein the host device comprises a command signal generator adapted to generate a command signal upon synchronization of the host device and the satellite device, and wherein the satellite device comprises a response signal generator adapted to generate a response signal upon receipt of the command signal from the host device.

10. The computer system of claim 9, wherein the command signal generated by the command signal generator comprises a plurality of bytes, and wherein the controller comprises a host delay mechanism adapted to delay the generation of the successive bytes of the command signal for a predetermined period of host delay time.

11. The computer system of claim 9, wherein the response signal generated by the response signal generator comprises a plurality of bytes, and wherein the satellite device comprises a satellite delay mechanism adapted to delay the generation of the successive bytes of the response signal for a predetermined period of satellite delay time.

12. The computer system of claim 1, wherein the controller comprises an inhibitor adapted to selectively inhibit the flow of data being transmitted through the conductor of the interface from the satellite device to the host device during the window for a predetermined period of inhibitor time, the predetermined period of inhibitor time being within a range of a minimum inhibitor time and a maximum inhibitor time.

13. The computer system of claim 1, wherein the conductor comprises a host device end having a single host contact pin and a satellite device end having a single satellite contact pin.

14. The computer system of claim 1, wherein the host device and the satellite device each comprise a microprocessor.

15. A computer system, comprising:

a host device comprising a host monitor adapted to monitor whether communication between the host device and a satellite device is in progress;

an interface in communication with the host device and the satellite device, the interface comprising a single conductor adapted to transmit a flow of data between the host device and the satellite device; and a host preventor mechanism for preventing the transmission of an additional flow of data from the host device to the satellite device when the host monitor determines that communication between the host device and the satellite device is in progress, and wherein the satellite device comprises a satellite monitor adapted to monitor whether communication between the satellite device and the host device is in progress, and a satellite preventor mechanism for preventing the transmission of an additional flow of data from the satellite device to the host device when the satellite monitor determines that communication between the satellite device and the host device is in progress.

16. The computer system of claim 15, wherein the satellite device further comprises a window controller adapted to close the window of the signal generated by the signal generator when the inhibitor of the host device has inhibited the flow of data being transmitted from the satellite device for a period of time longer than the maximum inhibitor time.

17. A method of transmitting data between a host device and a satellite device of a computer via an interface comprising a bi-directional, single conductor in communication with the host device and the satellite device, comprising:

generating a signal from the satellite device at a predetermined rate, the signal having a window representing a period of time during which a flow of data may be transmitted through the conductor of the interface;

monitoring the conductor for the opening and closing of the window;

synchronizing the host device with the satellite device when the window has been detected; and transmitting the flow of data between the host device and the satellite device upon synchronization of the host device and the satellite device.

18. The method of claim 17, further comprising the step of selectively inhibiting the transmission of the flow of data between the host device and the satellite device when the window is open for a predetermined period of inhibitor time, the predetermined period of inhibitor time being within a range of a minimum inhibitor time and a maximum inhibitor time.

19. The method of claim 17, further comprising the step of floating the conductor of the interface when the window of the signal generated by the satellite device is closed.

20. The method of claim 17, further comprising the steps of monitoring whether communication between the host device and the satellite device is in progress before synchronizing the satellite device with the host device, and preventing the transmission of an additional flow of data through the conductor of the interface if communication between the host device and the satellite device is already in progress.

21. The method of claim 18, further comprising the step of closing the window of the signal if the transmission of the flow of data between the host device and the satellite device has been inhibited for a period of time greater than the maximum inhibitor time.

22. The method of claim 17, further comprising the steps of:

generating a request to send command signal from the host device for synchronization of the host device and the satellite device; and generating a clear to send command signal from the satellite device upon receipt of the request to send command signal from the host device.

23. The method of claim 17, wherein the step of transmitting comprises the step of generating a command signal comprising a plurality of bytes from the host device, and wherein the method further comprises the step of delaying the generation of the successive bytes of the command signal for a predetermined period of host delay time.

24. The method of claim 23, wherein the step of transmitting comprises the step of generating a response signal comprising a plurality of bytes from the satellite device upon receipt of the command signal from the host device, and wherein the method further comprises the step of delaying the generation of the successive bytes of the response signal for a predetermined period of satellite delay time.

* * * * *